INVENTOR.
GEORGE D. YATICH
BY
ATTY.

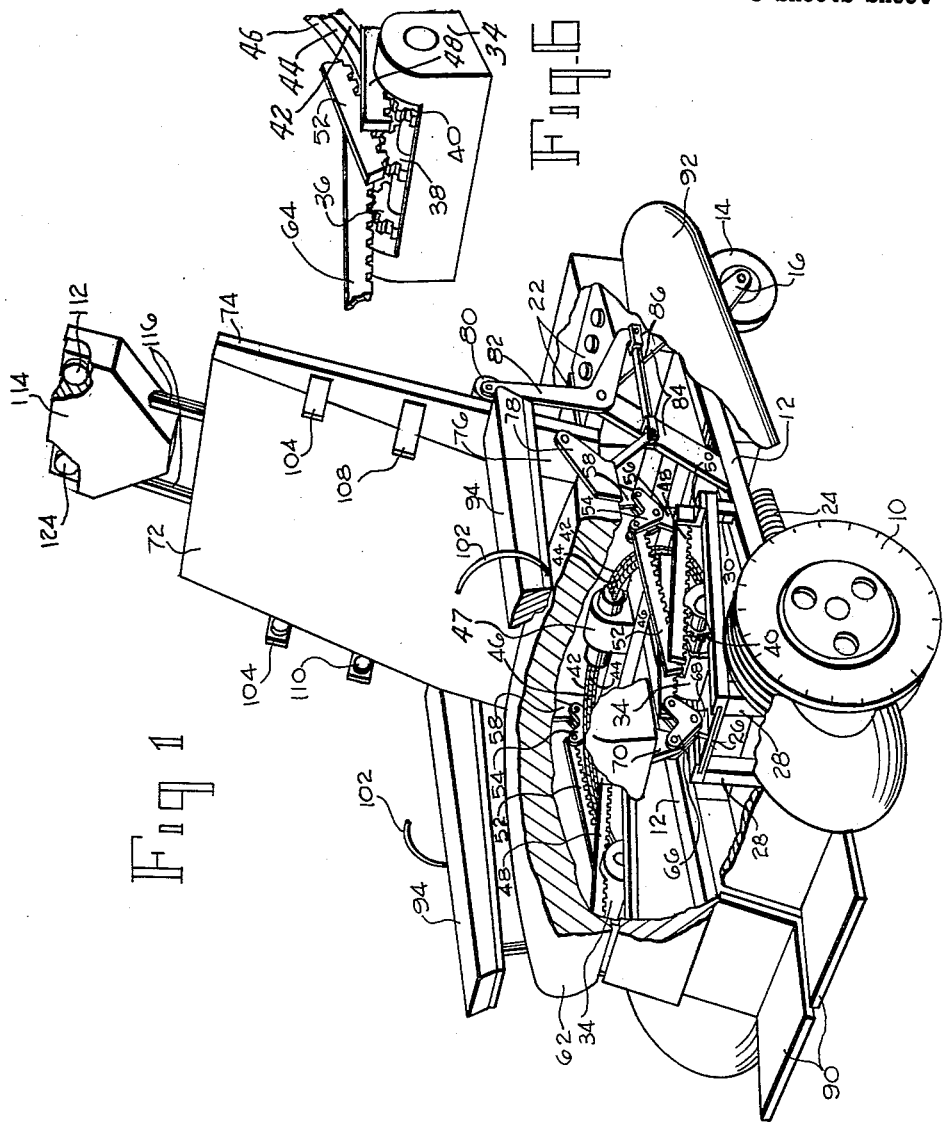

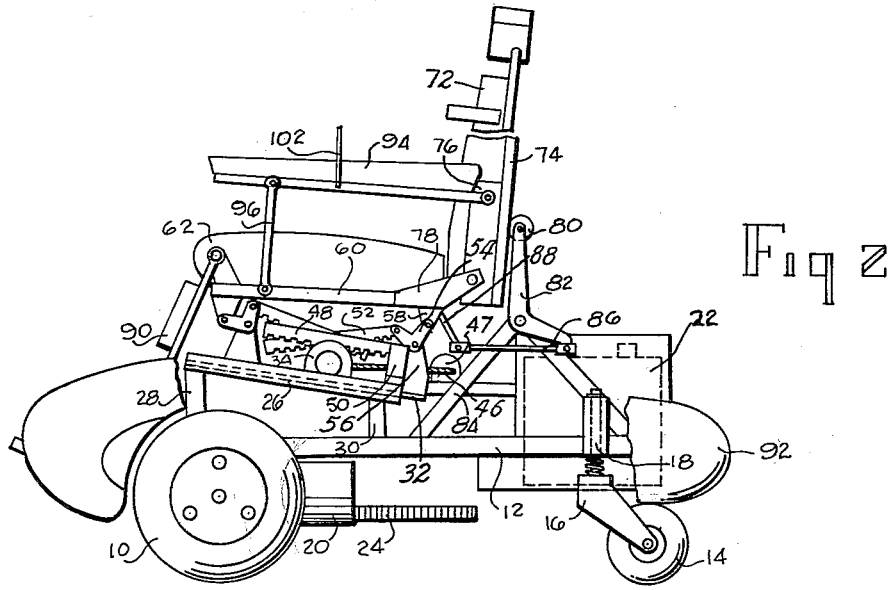
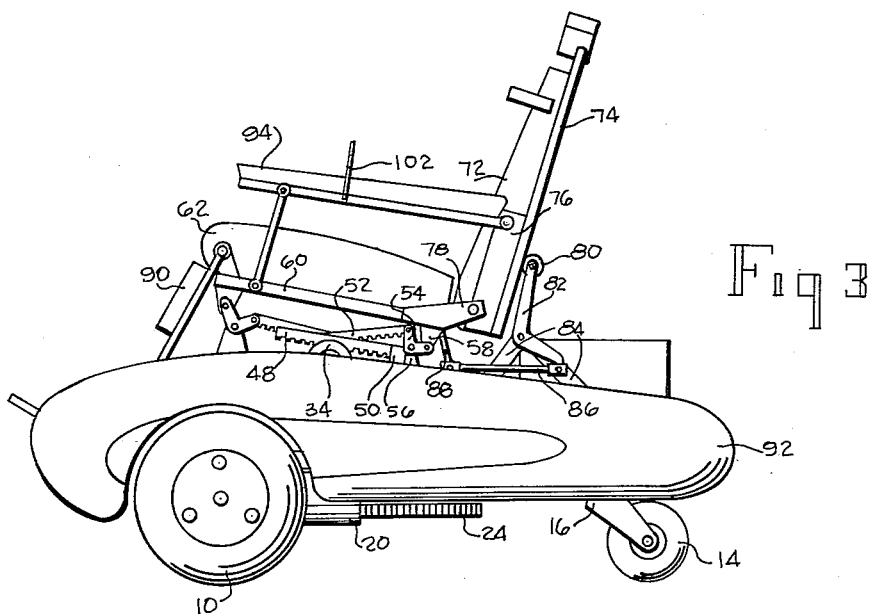

3,111,181
POWERED WHEELCHAIR
George D. Yatich, 4244 Rouge Circle,
Birmingham, Mich.
Filed July 5, 1961, Ser. No. 121,868
10 Claims. (Cl. 180—6.5)

This invention relates to a self-propelled wheelchair having power means for adjusting the occupant supporting portion into a variety of positions under the control of the operator.

Wheelchairs have been previously constructed which contain power sources and motors so that they may be self-propelled under the control of the operator. It is desirable that such chairs be constructed with a wide range of adaptability to support the needs of the occupant so that they may provide the occupant with a high degree of maneuverability, and they may be used by him for relatively long periods of time without discomfort occurring from remaining in a single position. The present invention therefore contemplates a wheelchair which is self-propelled under the control of the operator and which, additionally, may assume a variety of support positions varying between the normal seat with an upright back and a horizontal chair section and a flat horizontal position wherein the back becomes an extension of the chair section. The present invention further contemplates that the seat may be inclined with respect to the back at any convenient angle.

A preferred embodiment of the invention, which will be subsequently described in detail, provides these functions in such a manner that the center of mass of the occupant's body remains centered over the wheel of the vehicle independently of a particular position of the seat and back members. This requires that the seat be moved forward over the suspension system as the back becomes more inclined toward the horizontal to compensate for the resultant shift in the occupant's weight as this inclination occurs.

The present invention has a further object to provide control means which may be actuated by an almost totally immobilized occupant through movement of any part of his body over which he has positional control.

Other objects, advantages, and applications of the present invention will be made apparent by the following detailed description of a preferred embodiment of the invention. The description makes reference to the accompanying drawings in which:

FIGURE 1 represents a perspective view of the preferred embodiment of the invention, broken away at various points to reveal the control mechanism;

FIGURE 2 is a side view of the present invention, partially broken away, with the seat disposed in an upright position;

FIGURE 3 is a side view similar to that of FIGURE 2, with the back section slightly inclined with respect to the vertical;

FIGURE 6 is a detailed view of a section of the driving mechanism of the chair.

Figure 4:
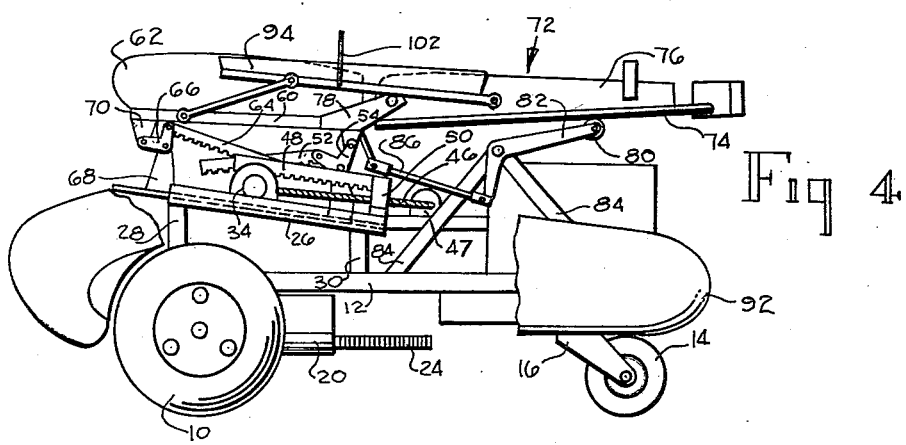
FIGURE 4 is a view of the preferred embodiment similar to that of FIGURE 2, wherein the chair is disposed in a complete horizontal position.

The major assemblies of the preferred embodiment of the chair are symmetrical about its forward-backward centerline and to a large extent the drawings, which are taken from the left side of the chair looking forward, only illustrate the mechanism on that side, the mechanism on the other side being complementary and identical.

The chair is supported above the ground and is movable on four wheels. The two front wheels 10 (only one of which is shown) are directionally fixed with respect to the frame number 12, while the two rear wheels 14 (only one of which is shown) are pivotably supported by casters 16 which are connected to the frame through spring loaded shock absorbers 18.

Each of the front wheels 10 is powered by a separate electric motor 20, powered from a battery 22 through a circuit which includes a tapped high-power resistance 24. The driving motor for each front wheel 10 is separate and has its own resistance. A reversing switch which will be subsequently described, is provided for each front wheel. The front wheels 10 are geared to their motors through a reducing drive which effectively locks the wheels against rotation when the motors are not powered.

Forward and reverse motions of the chair are obtained by powering both front wheels 10 simultaneously in the proper direction. Turning movements are obtained by powering only one wheel so that the other wheel remains locked and the rotation occurs about it, or by powering both wheels simultaneously in reverse directions.

The frame 12 also supports a pair of identical inclined guideways 26 on two pairs of front legs 28 and rear legs 30.

The guideways 26 extend along the forward-rearward line of the chair and incline downwardly from the relatively tall front legs 28 to the relatively short legs 30. The guideways 26 each channel and support a flat slideable platform 32 which is capable of forward-rearward movement along its guideways.

Centrally disposed along each of the platforms is a housing 34. The housings 34 act as rotary power transmission devices and each has three output gears 36, 38 and 40. These gears are all rotatable about a common transverse axis so that each gear is disposed in a plane parallel to the forward-rearward centerline of the wheelchair. Each of the gears is powered through two identical sets of three flexible cables 42, 44, and 46. The cables 42 are connected to the two gears 36, the cables 44 are connected to the two gears 38, and the cables 46 are connected to the two gears 40, so that rotation of one of the cables rotates its respective gear. The cables are powered through a motor 47 which has built-in clutches which allow it to power any of the three pairs of cables. Thus with the clutch in one position the two cables 44 are powered so as to rotate the two gears 38, and in the third position the two cables 46 are powered so as to rotate the two gears 40. The manner of selecting the proper clutch position will be subsequently described.

Each of the gears 36, 38 and 40 is in contact with a rack which bears on the gear. The gears 40 are contacted by racks 48 which have one of their ends fixed to the guideways 26 by angle plates 50. As the gears 40 are rotated in a clockwise direction, as viewed in the drawings, through the flexible shafts 46, they walk along the racks 48 in a forward direction thereby moving the platforms 32 with respect to the guideways 26. When the gears 40 are rotated in a counter-clockwise direction they walk along the racks 48 in a backward direction.

The gears 38 are similarly engaged by a pair of racks 52 which have their rearward ends pivotably trunnioned in one end of sets of linkage members 54. The linkage members are generally formed as right angles and have their corner sections pivotably supported on ears 56 which extend upwardly from the rear end of the platforms 32. The rearward ends of the linkage members 54 are pivotably trunnioned to similar ears 58 which are attached to the two rear corners of a rectangular frame member 60 that supports the upholstered seat 62 of the wheel chair. The pivotal connections between the linkage members 54 and the racks 52 contain spiral leaf springs (not shown) which maintain the racks 52 in biased contact with the gears 38.

In a similar manner the gears 36 are drivingly connected to a pair of racks 64 which have their forward ends pivotably trunnioned to linkage members 66. The linkage members are pivotably supported on ears 68 which rise up from the forward edges of the platforms 32 and have their opposite ends trunnioned onto ear members 70 which extend from the forward corners of the seat frame 60. The pivotal connections between the linkages 66 and the racks 64 are spring biased in such a manner as to maintain the racks 64 in constant mesh with the gears 36.

The linkage members 54 and 66 form the sole basis for support of the seat 62. Therefore the seat moves forward and backward with the platform 32 as a result of rotation of the gear 40. Rotation of the gears 38 causes motion of the racks 52 and a pivoting of the linkages 54 in such a manner as to raise or lower the rear edge of the seat 62. A clockwise rotation of the gears 38 as viewed in the drawings causes the racks 52 to be extended backward raising their points of connection with the linkages 54 and therefore lowering the point of connection between the linkage and the seat frame 60 thus lowering the rear edge of the seat. A counter-clockwise rotation similarly raises the rear edge of the seat. The gears 36 and the racks 64 act in a similar manner to raise or lower the forward edge of the seat 62.

The backrest member 72 of the wheel chair is formed in an upholstered manner on a frame comprising a back edge member 74 and side members 76. At its lower edges the sides 76 are pivotally supported with respect to the rear end of the seat frame 60 by means of a pair of arms 78. The arms 78 are rigidly attached to the seat frame 60 and pivotably connected to the back sides 76.

The backrest 72 is supported on its rear side by a pair of rollers 80 which are retained on the end of angular linkage arms in the form of bell crank levers 82. The linkage arms are pivotally supported at their corners on a frame 84 which is fixed with respect to the main frame of the chair. The other ends of the linkages 82 are pivotably connected by rods 86 to arms 88 which hang from the rear end of the seat frame 60.

Thus the position of the lower end of the back 72 is determined by its connection 78 with the seat and the angle of inclination of the seat back 72 is determined by the position of the linkages 82.

FIGURES 2, 3, and 4 illustrate three different relationships between the back 72 and the seat 62. In FIGURE 2 the platforms 32 are disposed toward the rear of the guideways 26, and the seat 62 is therefore in a generally rearward position with respect to the frame 12 of the wheelchair. This causes the rods 86 to pivot the linkages 82 in such a manner as to extend the backrest 72 in an almost vertical position. In this position the weight of the occupant is directly centered over the seat which is positioned centrally with respect to the wheelbase of the chair.

In FIGURE 3 the gears 40 have been rotated through the motor 47 to move the housing 34 and its platforms 32 to a more forward position with respect to the guideways 26. Therefore the seat 62 is moved forward with respect to the frame 12 of the wheelchair and rods 86 have been drawn forward so as to pivot the linkage 82 in a clockwise direction as viewed in the drawings and thereby cause the back 72 to be inclined in a clockwise direction with respect to its position in FIGURE 2. In FIGURE 4 the housings 34 are moved to their extreme forward position with respect to the guideways 26 causing the rods 86 to be drawn forward to a point where the back 72 assumes a horizontal position and acts as an extension of the seat 62 so the two form an almost unitary horizontal surface.

It should be noted that as the backrest 72 is inclined more towards the horizontal, and the weight of the occupant therefore falls more upon the back and less upon the seat, the seat assembly is moved forward with respect to the wheelbase of the chair so as to maintain the center of weight of the occupant in the proximity of the center of the wheelchair.

A pair of footrests 90 are suspended from the front edge of the chair frame 60. In other embodiments of the invention these footrests may be powered under the control of the occupant so as to allow them to be brought into a variety of positions.

A pair of arm members 94 are connected near their forward end points to the seat frame 60 by pivotable linkages 96 and at their rear ends to the seat side members 76, in such a manner that they are maintained parallel to the seat member independently of its angle of elevation.

Much of the lower mechanism of the chair is covered and protected by a pair of fenders 92 which attach to the frame members 12.

Figure 5:
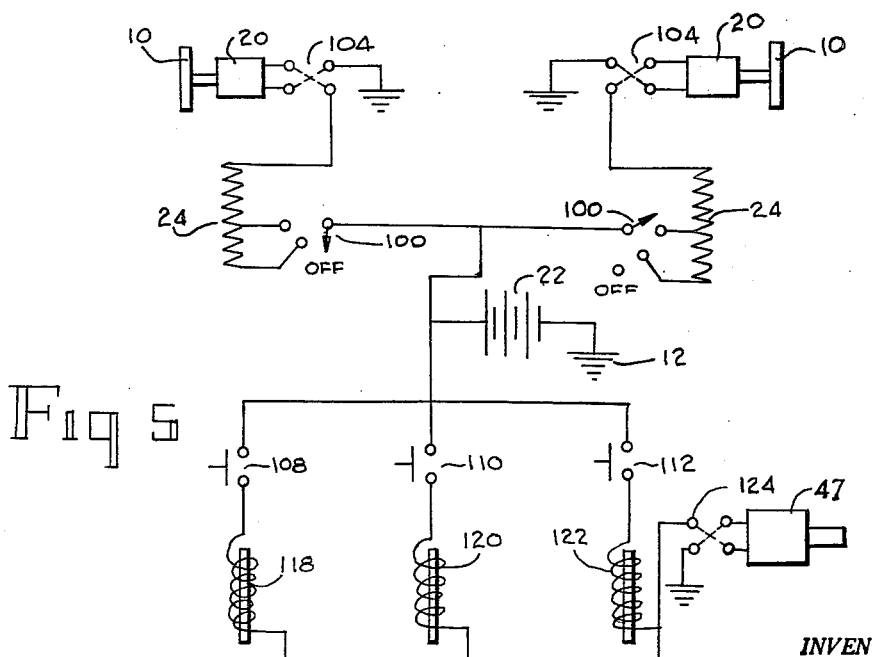
FIGURE 5 is a simplified schematic diagram of the control circuitry of the preferred embodiment.

The various control means provided to the occupant will be described in connection with the schematic diagram of FIGURE 5. The battery 22 has its negative terminal grounded to the frame 12 of the vehicle. Its positive terminal connects to a pair of three-position switches 100 which are disposed in the arms 94 of the chair and which have hooked control levers 102 (best seen in FIGURE 1) which may be controlled by the occupant's arm motion. The switches 100 each connect to two taps on their respective resistances 24 and to a normally closed "off" position. The occupant, by varying the position of the control levers 102 can thereby independently adjust the position of the two switches 100.

The ends of the resistances 24 are each connected to one terminal of double pole reversing switches 104. These switches are located along the sides of the back 72 and extend beyond the back surface adjacent to the position occupied by the occupant's shoulders so that a motion of the occupant's shoulders against either of the switches will actuate that switch.

The second input terminals of the reverse switches 104 are connected to ground. The output terminals of each switch are connected to the wheel powering motors 20. The switches 104 have a normal position wherein they connect the motor in such a manner as to drive the wheels 10 in a forward direction. When either of the reverse switches 104 is actuated by the occupant it reverses the current to its associated D.C. motor 20 and thereby reverses the direction of rotation of that motor and its wheel.

The switches 100 place a controlled portion of the resistance 24 in series with the associated motors. In this manner they act as speed control and on-off devices. By means of the switches 100 and the reversing switches 104 the input may control the actuation, speed and direction of each wheel 10 independently.

The positive terminal of the battery also connects to three normally open push buttons 108, 110, and 112. The switches 108 and 110 are located on the sides of the back 72 below the wheel reversing switches 104. The switch 112 is located in an upholstered headrest 114 which is fixed above the back 72 by a pair of support rods 116.

The switches 108, 110, and 112 are connected in series with three solenoid actuated clutches 118, 120, and 122 respectively. These clutches are located within the housing of the motor 47 and when actuated are operative to connect one of the pairs of cables 42 and 44 or 46 to the shaft of the motor 47. The other ends of the solenoid coils 118, 120, and 122 are all connected to one of the terminals of a reversing switch 124, which is located in the headrest 114. The other input terminal of reverse switch 124 is connected to the ground and the two output terminals of the reversing switch are connected to the motor 47.

The reversing switches 104, and 124 all have normal forward positions which are reversed by actuating the switches. The occupant may therefore selectively power the racks 48, 52 or 64 in a forward direction by actuating the switches 108, 110, or 112 and may power the racks in a reverse direction by simultaneously actuating the appropriate closure switch as well as the reverse switch 124.

It should be understood that the particular positioning of the controls and the exact nature and location of the various switches may be adapted to the needs and the capabilities of a particular occupant of the wheelchair.

Having thus described my invention, I claim:

1. A power operated adjustable wheel chair comprising a wheel frame, a plurality of ground engaging wheels carried by said wheel frame, a superstructure on said frame including a pair of guideways at opposite sides thereof inclined downwardly from the front of the chair towards the back thereof, a slide disposed on each of said guideways, a seat bottom, means mounting said seat bottom on said slides for forward and rearward movement along said guideways, a seat back hingedly connected to said seat bottom at adjoining edges for pivotal movement from a substantially right angle relationship where the seat is at a rearward position to a substantially coplanar relationship where the seat is at a forward position, movable back supporting means for said seat back pivotally mounted on said superstructure and interconnected to said seat bottom, said back supporting means being swingable about its pivot upon the movement of said seat bottom forward and rearward to lower and raise said seat back respectively, and power operated means on said superstructure for moving said slides and said seat bottom from the rearward position to the forward position and vice-versa, the forward movement of said slides up said guideways carrying said seat bottom which in turn swings said back supporting means in a direction about its pivot to lower said seat back toward the aforesaid coplanar relationship, and rearward movement of said slides and seat bottom down said guideways by said power operated means pivoting said back supporting means on its pivot in a direction to urge said seat back towards the aforesaid right angle relationship with said seat bottom.

2. A power operated adjustable wheel chair defined in claim 1 wherein said movable back supporting means include a pair of pivotally mounted elements located behind said seat back and near the opposite edges thereof.

3. A power operated adjustable wheel chair defined in claim 2 wherein said elements are in the form of bell crank levers.

4. A power operated adjustable wheel chair defined in claim 1 wherein one of said wheels is located near the front of the chair and is driven by an independently operated drive motor.

5. A power operated adjustable wheel chair defined in claim 1 wherein the load carrying axis of said chair is maintained in close proximity to the vertical center line of the wheel base of the frame during the movement of said slides and seat bottom.

6. A power operated adjustable wheel chair defined in claim 1 wherein said power operated means includes means for raising and lowering the forward and rearward edges of said seat bottom without affecting the angular position of said seat back.

7. A power operated adjustable wheel chair comprising a wheel frame, a plurality of ground engaging wheels carried by said wheel frame, including independently operated means for driving one of said wheels, a superstructure on said frame, a seat bottom, means mounting said seat bottom on said superstructure for forward and rearward movement, a seat back hingedly connected to said seat bottom at adjoining edges for pivotal movement from a substantially right angle relationship where the seat is at a rearward position to a substantially coplanar relationship where the seat is at a forward position, back supporting means for said seat back which is responsive to the forward and rearward movement of said seat bottom to lower and raise said seat back respectively, said back supporting means including a pair of bell crank levers pivotally mounted on said superstructure at the rear and at opposite edges of said seat back, said bell crank levers each including a pair of arms in angular relationship to one another, back engaging means carried by one of said arms engageable with the rear side of said seat back, actuating means interposed between said seat bottom and each of said other arms, and power operated means on said superstructure for moving said seat bottom from its rearward position to its forward position, the forward movement of said seat bottom urging said actuating means in one direction to swing said bell crank levers about their pivots so as to lower said seat back towards the aforesaid coplanar relationship with said seat bottom, and the rearward movement of said seat bottom urging said actuating means in the opposite direction to swing said bell crank levers about their pivots so as to raise said seat back towards the aforesaid right angle relationship with said seat bottom.

8. A power operated adjustable wheel chair defined in claim 7 wherein a pair of wheels are carried at the front end and at opposite sides of said frame, each of said front wheels having an independently operated drive motor therefor.

9. A power operated adjustable wheel chair defined in claim 7 wherein said seat bottom is mounted for movement on a pair of slides movable on a pair of guideways at opposite sides of said superstructure.

10. A power operated adjustable wheel chair defined in claim 7 wherein said back engaging means is in the form of a roller carried at the free end of said one arm.

References Cited in the file of this patent

UNITED STATES PATENTS

| | | |
|---|---|---|
| 677,234 | Kelly | June 24, 1901 |
| 1,391,529 | Crochat | Sept. 20, 1921 |
| 2,285,112 | Dorton | June 2, 1942 |
| 2,304,199 | Pinnow | Dec. 8, 1942 |
| 2,308,592 | Drexler et al. | Jan. 19, 1943 |
| 2,397,092 | Drexler et al. | Mar. 26, 1946 |
| 2,798,565 | Rosenthal et al. | July 9, 1957 |
| 2,886,094 | Pickles | May 12, 1959 |